(12) United States Patent
Onoda

(10) Patent No.: US 8,968,028 B2
(45) Date of Patent: Mar. 3, 2015

(54) CONNECTION STRUCTURE PROVIDED BETWEEN A BATTERY TERMINAL AND A FUSE UNIT

(71) Applicant: Yazaki Corporation, Minato-ku, Tokyo (JP)

(72) Inventor: Shinya Onoda, Makinohara (JP)

(73) Assignee: Yazaki Corporation, Tokyo (JP)

( * ) Notice: Subject to any disclaimer, the term of this patent is extended or adjusted under 35 U.S.C. 154(b) by 30 days.

(21) Appl. No.: 14/042,787

(22) Filed: Oct. 1, 2013

(65) Prior Publication Data

US 2014/0094062 A1  Apr. 3, 2014

(30) Foreign Application Priority Data

Oct. 3, 2012  (JP) ................................ 2012-221091

(51) Int. Cl.
*H01R 13/68* (2011.01)
*H01R 11/28* (2006.01)

(52) U.S. Cl.
CPC ............. *H01R 13/68* (2013.01); *H01R 11/281* (2013.01)
USPC .................................................. 439/620.26

(58) Field of Classification Search
USPC ............. 439/620.26, 754, 504, 522; 337/227, 337/295, 189, 142, 290; 307/10.1, 10.7
See application file for complete search history.

(56) References Cited

U.S. PATENT DOCUMENTS

| | | | |
|---|---|---|---|
| 5,805,047 A * | 9/1998 | De Villeroche et al. | ...... 337/290 |
| 6,030,257 A * | 2/2000 | Furuya | ...... 439/620.26 |
| 6,512,443 B1 * | 1/2003 | Matsumura et al. | ...... 337/189 |
| 6,805,593 B2 | 10/2004 | Spaulding et al. | |
| 8,636,550 B2 * | 1/2014 | Onoda et al. | ...... 439/766 |
| 2013/0027174 A1 * | 1/2013 | Masuda et al. | ...... 337/142 |

FOREIGN PATENT DOCUMENTS

| | | |
|---|---|---|
| DE | 10 2009 034 040 A1 | 2/2010 |
| JP | 2002-358867 A | 12/2002 |
| JP | 2005-116309 A | 4/2005 |
| JP | 2008-171624 A | 7/2008 |
| JP | 2010-192329 A | 9/2010 |

* cited by examiner

*Primary Examiner* — Vanessa Girardi
(74) *Attorney, Agent, or Firm* — Marvin A. Motsenbocker; Mots Law, PLLC

(57) ABSTRACT

In a connection structure of a battery terminal, including a battery terminal to be connected to a battery and a fuse unit to be mounted to the battery terminal through a fixing section, the connection structure being provided between the battery terminal and the fuse unit, the battery terminal is provided with a regulating protrusion formed in a protruding manner, while the fuse unit is provided with a plurality of regulating grooves, into one of which the regulating protrusion is made to engage so as to position a mounting position of the battery terminal to the fuse unit.

2 Claims, 3 Drawing Sheets

CONNECTION STRUCTURE PROVIDED BETWEEN A BATTERY TERMINAL AND A FUSE UNIT

BACKGROUND OF THE INVENTION

1. Field of the Invention

The present invention relates to a connection structure of a battery terminal for a fuse unit to which the battery terminal is mounted.

2. Related Background of the Invention

Conventionally, a connection structure of a battery terminal, which includes a battery terminal to be connected to a battery and a fuse unit to be mounted to the battery terminal through a fixing section, has been well known (for instance, refer to Patent Document 1). According to the connection structure of the battery terminal, a stud bolt, serving as a fixing section of the battery terminal, is made to engage with a bolt insertion hole, serving as a fixing section of the fuse unit, so as to connect the battery terminal and the fuse unit to each other by fastening the nut screwed into the stud bolt.

PRIOR ART DOCUMENT

Patent Document

[Patent Document 1] Japanese Patent Application Laid-Open Publication No. 2005-116309

SUMMARY OF THE INVENTION

However, according to the connection structure of the battery terminal set forth in Patent Document 1, due to a lack of a mechanism for positioning a mounting position of the battery terminal to the fuse unit, the mounting position of the battery terminal to the fuse unit has been unstable, or it has been impossible to change the mounting position only at predetermined mounting positions.

Hence, in a case of changing the mounting position of the battery terminal to the fuse unit, such as a case of avoiding interference with a peripheral member in accordance with a mounting space in a vehicle, the mountability thereof to the vehicle has been deteriorated due to the instability of the battery terminal at the changed mounting position, or due to such a fact that the battery terminal and/or the fuse unit should be changed to another one, since the mounting positions thereof cannot be changed.

Therefore, the present invention has an object to provide a connection structure of a battery terminal, which makes it possible to improve a mountability thereof to a vehicle.

The present invention is a connection structure of a battery terminal, including a battery terminal to be connected to a battery and a fuse unit to be mounted to the battery terminal through a fixing section, the connection structure being provided between the battery terminal and the fuse unit, wherein the battery terminal is provided with a regulating protrusion formed in a protruding manner, while the fuse unit is provided with a plurality of regulating grooves, into one of which the regulating protrusion is made to engage so as to position a mounting position of the battery terminal to the fuse unit.

In the present invention, it is preferable that the plurality of regulating grooves is arranged in a radial manner with respect to the fixing section.

DESCRIPTION OF THE PREFERRED EMBODIMENTS

Figure 1:
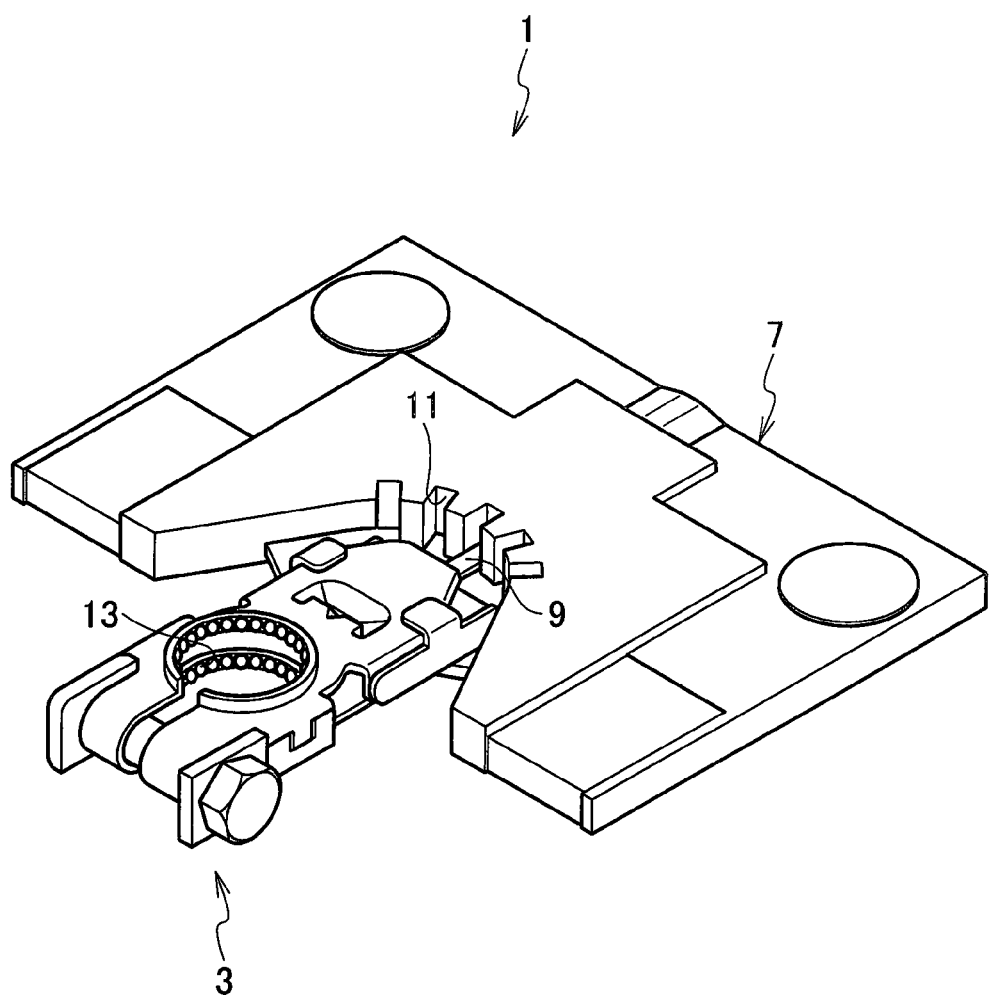
FIG. 1 is a perspective view of a connection structure of a battery terminal according to an embodiment of the present invention.
Figure 2:
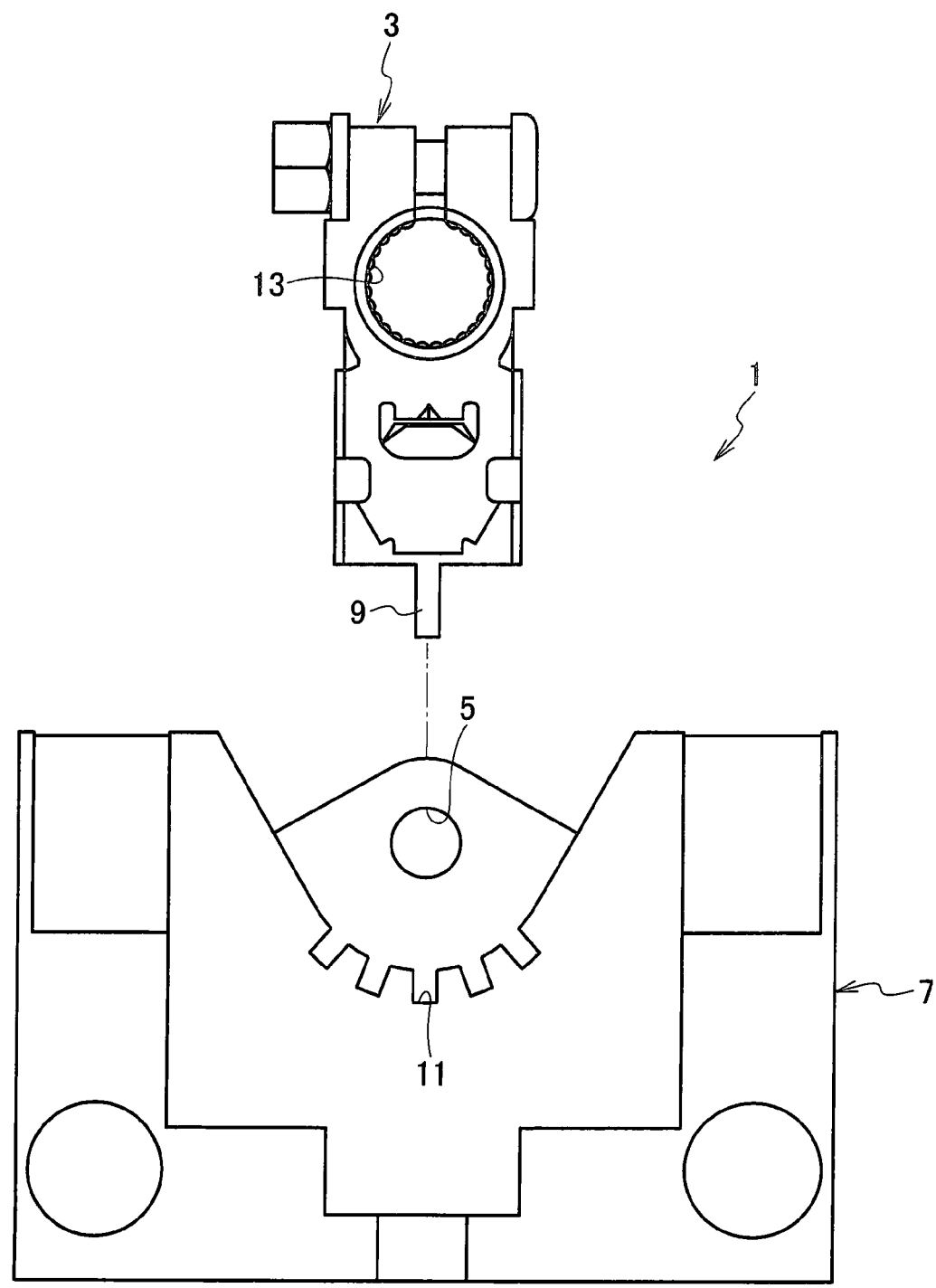
FIG. 2 is a front view of a connection structure of a battery terminal according to an embodiment of the present invention, before the battery terminal and a fuse unit are mounted.
Figure 3:
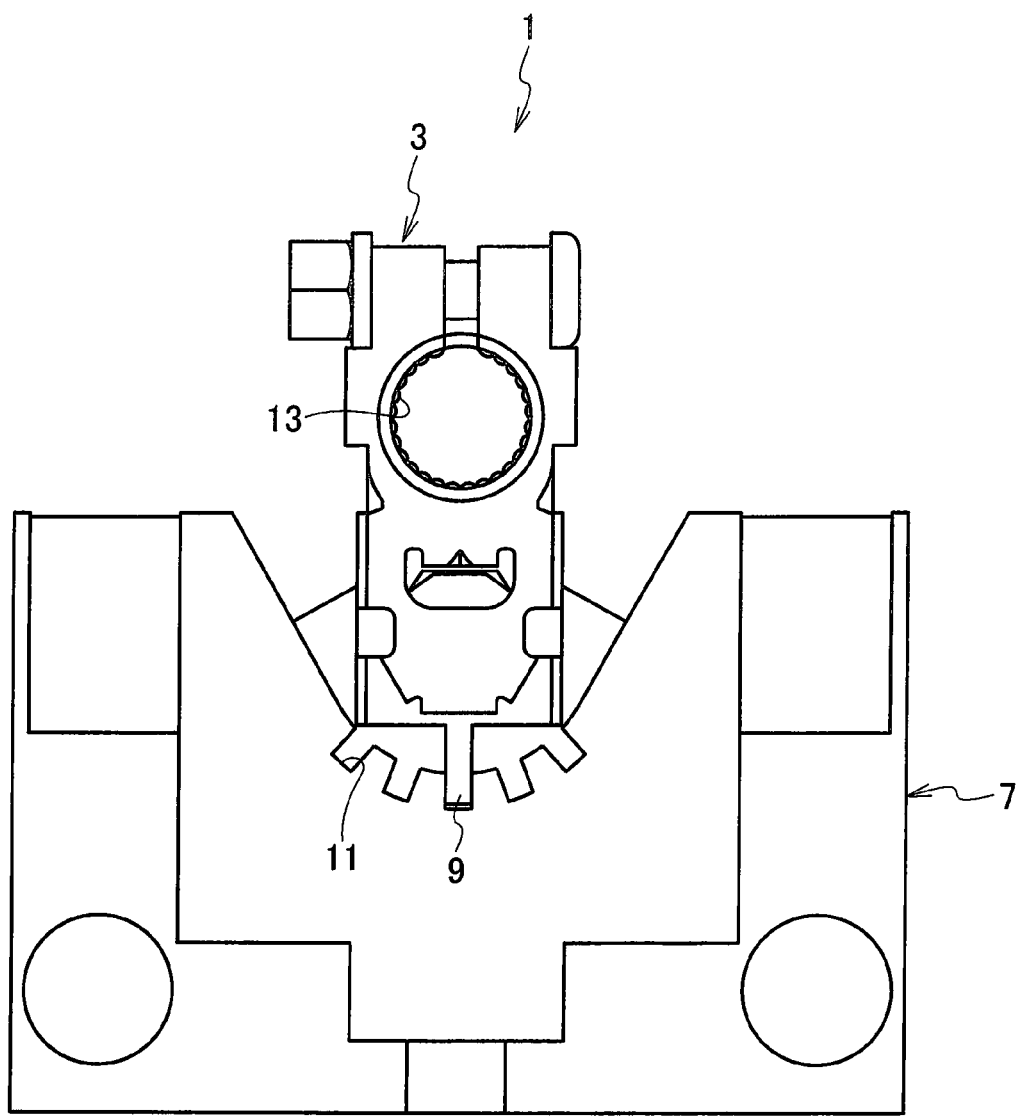
FIG. 3 is a front view of a connection structure of a battery terminal according to an embodiment of the present invention.

Referring to FIG. 1 through FIG. 3, a connection structure of a battery terminal according to an embodiment of the present invention will be described.

A connection structure 1 of a battery terminal according to the present embodiment is disposed between a battery terminal 3 to be connected to a battery (not shown in the drawings) and a fuse unit 7 to be mounted to the battery terminal 3 through a fixing section 5.

Further, a regulating protrusion 9 is provided in the battery terminal 3 formed in a protruding manner, while a plurality of regulating grooves 11, into one of which the regulating protrusion 9 is to be engaged so as to position the mounting position of the battery terminal 3 to the fuse unit 7, is provided in the fuse unit 7.

Still further, the plurality of regulating grooves 11 is arranged in a radial manner with respect to the fixing section 5.

As shown in FIG. 1 through FIG. 3, the battery terminal 3 is provided with a hole-shaped connection part 13, into which a battery post (not shown in the drawings) of the battery is to be inserted, so as to be connected to the battery. Further, on the opposite side of the connection part 13 of the battery terminal 3, a stud bolt (not shown in the drawings), which is to be inserted into the hole-shaped fixing section 5, is provided in a protruding manner. The fuse unit 7 is connected to the stud bolt of the battery terminal 3 so that the fuse unit 7 is connected to the battery through the battery terminal 3.

The fuse unit 7 includes a bus bar (not shown in the drawings), which is formed by molding a synthetic resin and to which at least a fuse (not shown in the drawings) is attached. Further, the fuse unit 7 is provided with the hole-shaped fixing section 5, so that the fuse unit 7 can be connected to the battery terminal 3 by fastening the nut screwed into the stud bolt, which is inserted into the fixing section 5, therethrough.

The above-mentioned battery terminal 3 and the fuse unit 7 are provided with the regulating protrusion 9 which positions the mounting position of the battery terminal 3 to the fuse unit 7, and the plurality of regulating grooves 11, respectively.

The regulating protrusion 9 is protruded from a side surface of the battery terminal 3. The regulating protrusion 9 is made to engage with one of the plurality of regulating grooves 11 provided in the fuse unit 7, in such a state that the battery terminal 3 and the fuse unit 7 are mounted to each other.

The plurality of regulating grooves 11 is arranged on a plurality of lines extended from a center of the fixing section 5 and spread in a radial manner, and herein, five regulating grooves are provided in a radial manner with respect to the fixing section 5. In such a state that the battery terminal 3 and the fuse unit 7 are mounted to each other, one of the plurality of regulating grooves 11 is made to engage with the regulating protrusion 9 so as to position the mounting position of the battery terminal 3 to the fuse unit 7, and then, the battery terminal 3 is held at the mounting position.

By making the above-mentioned regulating protrusion 9 engage with one of the plurality of regulating grooves 11, it becomes possible to arbitrarily change the mounting position of the battery terminal 3 to the fuse unit 7. In addition, the engagement between the regulating protrusion 9 and one of the plurality of regulating grooves 11 makes it possible to stably hold the battery terminal 3 at the mounting position.

According to the connection structure 1 of the battery terminal as described above, since the battery terminal 3 is provided with the regulating protrusion 9 in a protruding manner, while the fuse unit 7 is provided with the plurality of regulating grooves 11, one of which is made to engage with the regulating protrusion 9 so as to position the mounting position of the battery terminal 3 to the fuse unit 7, it becomes possible to change the mounting position of the battery terminal 3 to the fuse unit 7 in accordance with a mounting space in a vehicle.

Further, since the regulating protrusion 9 of the battery terminal 3 is made to engage with one of the plurality of regulating grooves 11 of the fuse unit 7 at the mounting position, it is possible to stably hold the battery terminal 3 at the mounting position.

Accordingly, such the connection structure 1 of the battery terminal 3 as described above makes it possible to stably change the mounting position of the battery terminal 3 without replacing the battery terminal 3 and/or the fuse unit 7 in accordance with the mounting space in a vehicle, and as a result, it becomes possible to improve the mountability thereof to the vehicle.

Still further, since the plurality of regulating grooves 11 is provided in a radial manner with respect to the fixing section 5, the mounting position of the battery terminal 3 can be changed to anyone of various angles around the center of the fixing section 5, and it is possible to hold the battery terminal 3 at the changed mounting position.

In this connection, although the five regulating grooves are provided as the plurality of regulating grooves in the connection structure of the battery terminal according to the embodiment of the present invention, the scope of the present invention is not limited thereto, and it is possible to provide more than five regulating grooves.

This application claims for priority based on Japanese Patent Application NO. 2012-221091 filed on Oct. 3, 2012, the entire content of which is hereby incorporated by reference.

INDUSTRIAL APPLICABILITY

According to the present invention, it becomes possible to provide a connection structure of a battery terminal, which makes it possible to improve the mountability thereof to a vehicle.

DESCRIPTION OF REFERENCE NUMERALS

1 connection structure of battery terminal
3 battery terminal
5 fixing section
7 fuse unit
9 regulating protrusion
11 a plurality of regulating grooves

What is claimed is:

1. A connection structure of a battery terminal, comprising:
a battery terminal to be connected to a battery; and
a fuse unit to be mounted to the battery terminal through a fixing section, the connection structure being provided between the battery terminal and the fuse unit
wherein the battery terminal is provided with a regulating protrusion formed in a protruding manner, while the fuse unit is provided with a plurality of regulating grooves, into one of which the regulating protrusion is made to engage so as to position a mounting position of the battery terminal to the fuse unit.

2. The connection structure of a battery terminal according to claim 1,
wherein the plurality of regulating grooves is arranged in a radial manner with respect to the fixing section.

* * * * *